Patented Jan. 28, 1930

1,745,084

UNITED STATES PATENT OFFICE

BRADLEY DEWEY, OF CAMBRIDGE, AND ERNEST C. CROCKER, OF BELMONT, MASSACHUSETTS; SAID CROCKER ASSIGNOR TO SAID DEWEY

RUBBER-LATEX CEMENT AND METHOD OF PREPARING THE SAME

No Drawing.      Application filed November 20, 1924. Serial No. 751,193.

Our invention relates to the composition of vulcanizable rubber cements, and has for its chief object the provision of a fluid cement which carries a large proportion of rubber, and employs a liquid vehicle free from the disadvantages of volatile and inflammable rubber solvents, and free also from the toxic properties of the solvents which though not inflammable are nevertheless highly volatile.

The difficulties and disadvantages which it is our aim to overcome are well illustrated by the use of rubber cements in the manufacture of bristle brushes. These cements, which employ volatile solvents of rubber as the fluid vehicle for carrying the rubber and the accompanying vulcanizing material into contact with the solid materials to be cemented, must contain less than 15% of rubber in order to be usable viscosity. The usual content of rubber, 11% to 13% in such cements, is obtained only by milling the rubber to such a degree as seriously to degrade its strength.

In applying these rubber cements to the bristles of brushes, considerable time must be allowed for the penetration of the viscuous cement into the interstitial body formed by the assembled bristles, the penetration is liable to be uneven, even when the bristles are packed with care and skill.

The vulcanizable cement which we have invented consists essentially of rubber latex with a vulcanizing agent such as sulfur uniformly distributed through and held suspended in it by means of a relatively small proportion of bentonite. By rubber latex we mean the latex as drawn from the rubber tree, or as preserved by any of the well known means, such as the addition of ammonia.

Latex, being a natural or synthetic emulsion of rubber in water, is relatively non-volatile, non-inflammable, and non-toxic. Its use involves none of the changes in composition which attend the rapid volatilization of the usual solvents of rubber. Moreover, with latex a rubber content of 35% or more is consistent with high fluidity and consequent facility of penetration into and distribution over, solid objects to be cemented. The rubber obtained from the drying of latex is far stronger than that obtained from the evaporation of ordinarily used solvents, even though such rubber has not been subjected to severe milling. Probably the high strength of rubber resulting from the vulcanization of a latex cement is due to the fact that the rubber is in its primary state of coagulation from the condition of emulsion.

But, in order to produce a practicable vulcanizable latex cement, the latex emulsion must contain, in substantially permanent dispersion, the necessary ratio of sulfur, about one part of sulfur to two of rubber, by weight. Sulfur, as ordinarily used, settles out from latex much more rapidly than from the more viscous solution of rubber in ordinary solvents.

The invention herein described is characterized by the maintenance of finely divided sulfur in distribution through rubber-latex by the agency of bentonite which affords such support to the particles of finely divided sulfur that the sulfur will not collect or settle out appreciably, even after several hours' standing.

The capacity of bentonite for dispersion in a liquid suggests, if it does not demonstrate, that there is associated with the particles of clayey constitution a protective colloid which functions to prevent coagulation. This theory is strengthened by the fact that the addition to it of a small proportion of saponin (or other recognized protective colloid) facilitates the operation of the material. Such a material is obtainable in the market under such names as "colloidal earth", "clayoid", and "bentonite".

For our purposes, take 90 parts of flowers of sulfur, 15 parts of the colloidal clayey material ("bentonite") and preferably, though not necessarily, 3 parts of saponin, and mill or otherwise intimately mix these with 590 parts of water. Then to this add 462 parts of latex containing about 38% of the solids naturally occurring therein. This composition, though sufficiently fluid to serve all the purposes of a vulcanizable cement (as for the setting of brush bristles) will hold its sulfur in suspension and distribution almost indefinitely without appreciable settling.

Whether the distributed sulfur be in a state of collodial subdivision, and associated with a protective colloid, or be composed of particles which, though very small, have nevertheless a much lower specific surface than those of colloidal sulfur, and be associated with material such as bentonite which in small proportions exerts a sustaining action on the sulfur surface-action which counteracts the effect of gravity or the cohesive forces which tend toward flocculation. The practical value of using agencies of this character is especially manifested when relatively large proportions of ordinary flowers of sulfur are held in suspension in latex, as for example, amounts corresponding to the full vulcanizing capacity of the rubber therein by means of a very minor proportion of bentonite. Thus it is made possible to produce a dense, hard rubber by the direct vulcanization of the rubber in latex.

If desired, accelerators of vulcanization, and other compounding ingredients may be added to the latex-cement prepared in either of the above modes, the colloidal material present, exemplified by bentonite, will be found effective to hold in suspension compounding ingredients such as are commonly associated with rubber, which, without the colloidal material present, would settle.

What we claim and desire to secure by Letters Patent is:

Vulcanizable fluid cement composition, comprising rubber latex with finely divided sulfur dispersed therein, and a minor proportion, as compared either with the rubber or sulfur, of bentonite also dispersed in the water of suspension.

Signed by me at Boston, Massachusetts, this 13th day of November, 1924.

BRADLEY DEWEY.

Signed by me at Boston, Massachusetts, this 17th day of November, 1924.

ERNEST C. CROCKER.